US010778708B1

(12) United States Patent
Hoffman et al.

(10) Patent No.: US 10,778,708 B1
(45) Date of Patent: Sep. 15, 2020

(54) METHOD AND APPARATUS FOR DETECTING EFFECTIVENESS OF SECURITY CONTROLS

(71) Applicant: Lumeta Corporation, Somerset, NJ (US)

(72) Inventors: Brandon Hoffman, Cocoa Beach, FL (US); Namrata Patel, Raritan, NJ (US); George Budd, Randolph, NJ (US); Bill Robinson, Flemington, NJ (US)

(73) Assignee: Lumeta Corporation, Somerset, NJ (US)

( * ) Notice: Subject to any disclaimer, the term of this patent is extended or adjusted under 35 U.S.C. 154(b) by 98 days.

(21) Appl. No.: 15/872,527

(22) Filed: Jan. 16, 2018

Related U.S. Application Data

(60) Provisional application No. 62/447,023, filed on Jan. 17, 2017.

(51) Int. Cl.
*H04L 29/06* (2006.01)

(52) U.S. Cl.
CPC ...... *H04L 63/1425* (2013.01); *H04L 63/1433* (2013.01)

(58) Field of Classification Search
CPC .......... G06N 20/00; G06N 5/022; G06N 5/04; G06N 7/005; H04L 41/0893; H04L 63/1416; H04L 63/1425; H04L 63/1441; H04L 63/20; H04L 2463/121; H04L 41/145; H04L 41/22; H04L 43/00; H04L 43/045; H04L 43/062; H04L 43/08; H04L 63/06; H04L 63/1408; H04L 63/1433; H04L 63/145; H04L 41/0213; H04L 43/10; H04L 61/2503; H04L 61/2514; H04L 63/0209; H04L 63/0227; H04L 63/1466; H04L 43/026; H04L 43/14; H04L 63/14; H04L 41/0609; H04L 41/12; H04L 67/12; H04L 69/40; G06F 16/24578; G06F 16/254; G06F 16/285; G06F 16/444; G06F 16/9024; G06F 3/0482; G06F 3/0484; G06F 3/04842; G06F 3/04847; G06F 40/134; G06F 21/552; G06F 16/2228; G06F 21/554; G06F 16/21; G06F 16/212; G06F 16/951; G06K 9/2063; H05K 999/99; G06Q 10/06; G06Q 10/10; G06Q 10/107; G06Q 50/18; Y04S 40/164; Y04S 40/166; Y04S 40/168; Y04S 40/18
See application file for complete search history.

(56) References Cited

U.S. PATENT DOCUMENTS

2014/0137257 A1* 5/2014 Martinez ............. H04L 63/1433 726/25
2015/0288712 A1* 10/2015 Jones ................... H04L 63/1433 726/25

* cited by examiner

*Primary Examiner* — Abiy Getachew
(74) *Attorney, Agent, or Firm* — Morgan, Lewis & Bockius LLP

(57) ABSTRACT

An index of network data is received, the index including network infrastructure data, network connection topology data and network devices data, collected in real time. Data describing one or more cybersecurity threat sources is received. Data describing communications occurring with devices within the network is received. The data describing the one or more cybersecurity threat sources and the data describing the communications occurring with devices within the network are analyzed to identify data describing possible security threats. The data describing the possible security threats is correlated with the index of network data to identify security threats to devices within the network.

4 Claims, 2 Drawing Sheets

METHOD AND APPARATUS FOR DETECTING EFFECTIVENESS OF SECURITY CONTROLS

CROSS REFERENCE TO RELATED APPLICATIONS

This application claims priority to U.S. Provisional Patent Application No. 62/447,023, filed Jan. 17, 2017, which is incorporated by reference herein in its entirety.

FIELD OF THE INVENTION

The invention relates to determining whether security controls are effectively preventing malware callback, command and control channels and data ex-filtration of networks.

BRIEF SUMMARY OF THE INVENTION

The present invention involves receiving an index of network data. The index includes network infrastructure data, network connection topology data and network devices data, collected in real time. Data describing one or more cybersecurity threat sources is received. Data describing communications occurring with devices within the network is received. The data describing the one or more cybersecurity threat sources and the data describing the communications occurring with devices within the network are analyzed to identify data describing possible security threats. The data describing the possible security threats is correlated with the index of network data to identify security threats to devices within the network.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings.

DETAILED DESCRIPTION OF EMBODIMENTS OF THE INVENTION

Figure 1:
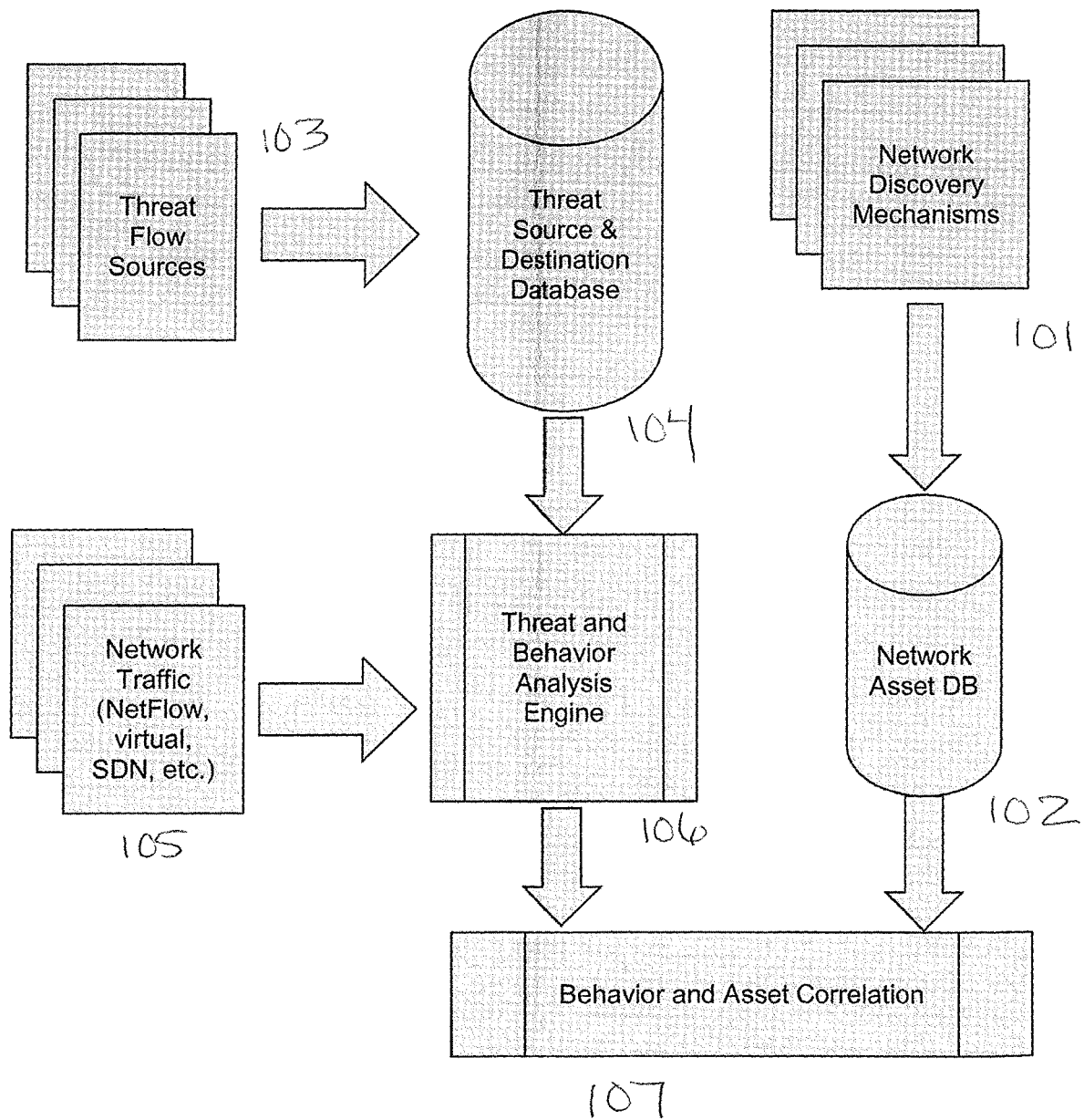
FIG. 1 is a flow diagram illustrating an exemplary method of the present invention, and associated hardware/software components.

Aspects of the present invention solve the technical problem of determining whether physical, virtual, cloud container and software defined network-based cyber security controls are effectively preventing malware callback (e.g., a type of network behavior usually sent by threats for collecting feedback data or controlling threats remotely), command and control channels (e.g., servers and other technical infrastructure used to control malware in general, and, in particular, botnets), and data ex-filtration (e.g., the unauthorized copying, transfer or retrieval of data from a computer or server).

A number of different security control methodologies (e.g., defensive strategies to control malicious activity on a network) are known in the art. Such methodologies include inventorying and managing authorized and unauthorized devices; establishing, implementing, and actively managing security configurations for computers on the network; identifying and remediating vulnerabilities; limiting and controlling network ports, protocols, and services; implementing and managing security configuration of network infrastructure devices; conducting network boundary defenses; and controlling wireless access points.

Currently known approaches to identifying malicious communications involve examining and correlating activity, either manually or using forensic monitoring tools. While it is possible for security teams (i.e., humans) to monitor for unusual activity in logs, this analysis is usually performed after a breach event has successfully occurred or has been in process for some time. Further, such methods require skilled, trained security personnel. After a breach is identified, outside consulting firms are often brought in to analyze log data from network infrastructure systems, security information and event management (SIEM) or log management systems and recreate the events that led to the breach. This is neither real time nor efficient. Such analysis is after-the-fact (i.e., forensic) and, thus, does not allow an organization to interrupt or stop the breach from occurring.

Intrusion detection/prevention systems (IDS/IPS) and deep packet inspection tools are also known. These systems are installed in-line in the data path and have the capability to examine the user data packets/payloads in real time and identify signatures of malicious activity. While they are real-time in nature, several issues exist. First, such systems and tools require placement of the IDS/IPS at all the network choke points so they can see all the traffic. In a large and increasingly dynamic/changeable network (e.g., virtual or hybrid cloud/container with virtualized network infrastructure functions), this is difficult (e.g. consider, for example, east-west traffic within a hypervisor or IAAS cloud/container). Second, an increasing number of the user data packet payloads are encrypted end-end and, thus, the data payload is opaque to IDS/IPS. In many attacks, one of the first steps of a malicious actor is to encrypt the traffic during exfiltration, making it invisible to IDS/IPS systems. Furthermore, much of the traffic inside an enterprise is encrypted end-to-end as well (e.g., https).

Network Behavior Analysis (NBA) based on flow collection and analysis is another known approach, in which flow data from all across the enterprise is collected and then analyzed. Pursuant to this approach, a baseline of activity is achieved and then anomalies/deviations in communications (flows) are highlighted as potential conditions that represent a breach. This technique is very powerful, but requires collection of flow from everywhere across the enterprise, which is a difficult deployment task, particularly for large organizations with a distribution of thousands of network infrastructure switches and routers in place. Also, it is impossible to know that all relevant flow information has been obtained, or to know in real-time that no gaps exist. Still further, such solution does not take into account flow data obtained from virtual or cloud/container infrastructure, which is increasingly in use within organizations.

Unlike NBA, the systems and methods of the present invention involve ingesting flow data from the network edge (e.g., gateway/firewalls, or cloud via API) into the platform. Real-time network indexing is used and, as a result, the existence of the edge is known. This information can be highlighted to network security so that all the relevant flow about data crossing the edge is collected. This is a much easier problem to solve, and maintain over time as networks change. This approach also works with cloud/container infrastructure, because the edge-flow information can be derived from API delivered content supplied from a cloud infrastructure. Furthermore, using this approach, the existence of all the endpoints is known, in real-time, as a result of indexing of the network. Lastly, threat-intelligence about bad actor presence (e.g., C2 botnets, TOR) is ingested from a number of commercially available or open-source services that highlight public IP addresses (or DNS names) that are known, via crowd-sourced intelligence about the Internet. That data is combined and correlated with the data from these three sources (1. local knowledge of endpoints, 2. netflow from the edge and 3. public IP addresses (or DNS names) of known bad-actors) so as to identify, in real-time, suspect communications (also referred to herein as threat-flows).

Such a system is easier to deploy and maintain than NBA and, thus, is technologically superior. For example, the inventive approach only requires a) knowledge that the endpoint is on the network, b) flow data from the edge network infrastructure and c) a source of external threat intelligence to ingest/use. It does not require deep packet inspection-like analysis of the actual data traffic to/from the endpoint as with IDS/IPS. It is, therefore, not subject to the issues of payload encryption or opacity. Further, it provides indicators of compromise in real time, unlike manual monitoring or forensic analysis. Thus, the malicious activity can be detected and interrupted as it is occurring, likely before the breach and before it is successfully able to ex-filtrate significant data.

Existing netflow-based analysis tools attempt to consume all netflow from within the organization and analyze the data to determine anomalous cybersecurity behavior. These offerings are typically very complicated and expensive to deploy within an enterprise infrastructure. Unlike prior art systems, the systems and methods of the present invention provide advantages over known methods because they rely on a real-time, holistic index of network infrastructure (e.g., routers, switches, etc.), connection topology and endpoints/ hosts/IoT devices. Thus, the invention requires an indexing of less than all of the netflow, whereas the prior art looks at all available information. In fact, network baselining is noted as one of the major deployment difficulties with prior art platforms. The real-time, holistic network infrastructure index of the present invention allows for selectively ingesting (i.e., consuming from an external source into a file system, such as a Hadoop Distributed File Service (HDFS), so that it can be analyzed as described herein) flow data (e.g., from the edge devices), thereby reducing deployment expense. This, along with other recursive network indexing summary data (e.g., real-time knowledge of all of the endpoints, where they are and how they are connected to the network infrastructure, whether physical, virtual, or cloud based endpoint, when they first arrived on the network, the last time they were identified on the network, IP/MAC address pair currently in use, TCP ports open and in use and a profile of what type of endpoint device it is), identifies cybersecurity indicators of compromise for less than half the deployment time and cost of prior art offerings.

Known deep packet capture, inspection and analysis tools attempt to consume all packets from within the organization and analyze their payloads to determine anomalous cybersecurity behavior. This approach is very expensive to deploy in the network infrastructure in order to collect all enterprise packet traffic. Furthermore, packet payloads are increasingly encrypted end-end (e.g. via SSL/TLS) making payload visibility opaque or completely impossible. The analysis performed by the systems and methods of the present invention are focused on the existence of communication between an organization's network devices and any known threat sources, thereby eliminating the need to examine or access payload. Also unlike known deep packet inspection tools, the analysis performed by the systems and methods of the present invention does not require decrypting and inspecting the contents of network traffic packets. Instead, the analysis focuses on packet traffic profiles (protocols, ports, sources and destinations), which may include threat flow participants. The presence of packets matching the packet traffic profiles is strong enough evidence to raise the alarm for security teams.

The present invention involves a system that analyzes threat-flow sources defining known bad actors and correlates that information against observed unauthorized network connections, anomalous changes in behavior (e.g., forwarding traffic), and data flow (i.e. netflow) in real-time. Aspects of the present invention further apply the found critical network flows (i.e., threatflows to bad actors) to a process correlating them against discovered physical, cloud and SDN-based network assets. It can immediately be determined what endpoint(s) are involved in the communication within the enterprise and where such endpoints are (e.g., subnet, zone, switch port, etc.) for fast remediation. Such remediation can be entirely automated, and not require human involvement. Such flows are findings that are based on the correlation analysis of netflow and threat intelligence. It involves identifying network assets, which are engaged in network communication with known threat-flow sources or as a threat-flow source itself, in real-time.

Network communications encompass the packets of various protocols, e.g., TCP, UDP, ICMP, and their order (e.g., it may be appropriate to understand if the first threatflow occurred using a UDP communications, followed by a series of TCP communications over various ports). The ordering may be indicative of a particular malware approach being used and help with characterization of the threat. The series of packets comprise a conversation between two devices over a network, potentially including over the Internet. These conversations can result in data transferal between the two devices, and/or a device being directed to execute certain operations by the other (also known as command and control). The behavior of the devices in regards to the network communications involves the reaction of the involved devices to the network communication. This can include error messages rejecting the communication, data transfer, or one or both of the devices generating further traffic to different devices, by way of example. Data flow refers to the flow of packets between the communicating devices, including rate, type, and quantity. Important observations with respect to the data flow include whether the data flow represents data-exfiltration or command and control operations. Critical network flows in this context are those flows identified as representing network communications between identified threat sources and other devices. A device is identified as a threat flow source if it is included in the threat flow source feeds (i.e., Internet-based threat intelligence services).

An exemplary embodiment is now described with reference to FIG. 1. In accordance with such exemplary embodiment, real-time, holistic indexing of network infrastructure (routers, switches, etc.), connection topology and endpoints/ hosts/IoT devices (e.g. real-time network state metadata) is performed by network discovery mechanisms 101. A variety of network discovery mechanisms may be used but, in a preferred embodiment of the invention, this indexing includes cyber situational awareness and knowledge of transitory network infrastructure (e.g., private or public cloud, virtualized network functions) and mobile devices/endpoints. In the preferred embodiment, the concept of network state visibility is based on using network control plane traffic (BGP, OSPF, DNS, DHCP, ARP) and active interrogation via probe packets/responses as described in more detail in U.S. patent application Ser. No. 14/497,428, which is incorporated by reference herein. The network infrastructure data is stored in a network asset database 102.

Once the network infrastructure is discovered and indexed, one or more open source and/or subscription-based threat intelligence service feeds and repositories 103 are processed and stored in threat source and destination database 104. Such threat flow data identifies malicious actor IP addresses, URLs, domains, etc. of servers and networks, residing on the public Internet, for example, and associated attributes and characteristics, to the extent available. In a preferred embodiment, such threat flow information is updated regularly (e.g., on a daily, or more frequently such as multiple times a day or hourly) basis. Such information may be updated more frequently and/or may be managed on a schedule appropriate for the fungibility of the different threat flow sources, as well as user requirements. In addition, network traffic data may be collected from component 105 (e.g., an edge firewall, router/switch) directly. Alternatively, flow collection appliances may be used that consume flow from multiple devices like component 105 and allow a flow consumer to access it readily.

The threat source and destination data and netflow data is processed, by threat and behavior analysis engine 106, to identify information including the following (although not all sources of such data may contain all such fields): IP address, Port, Protocol, threat score, first_seen, last_seen, malware_family, last_seen_as, confidence, severity. This information is then stored for retrieval and comparison to observed netflow (i.e., network communications data), by behavior and asset correlation engine 107. Both summarized and un-summarized netflow (particularly of inbound or outbound traffic crossing the enterprise edge or perimeter) may be ingested by configuring netflow collectors, already deployed in the enterprise, to provide netflow to the appropriate destination. This ingestion may also apply to metadata related to dataflow transactions from interconnected cloud and software defined network infrastructures.

Continuing now to refer to FIG. 1, a set of IP addresses associated with known bad actors from varied external sources (103) is received. S{threat IPs} is referred to herein as known as threat intelligence. Netflow traffic (105), which contains source IP, destination IP, port, protocol, and time attributes, is received. This flow documents network traffic, or conversations, between the device at the source IP and the device at the destination IP, referred to as a S{potential threat conversations}. Device IPs are discovered by a process at 101 and stored at 102, referred to as S{discovered IPs}. The Intersection{threat IPs, potential threat conversations} as {refined threat flows} is defined at 106 where the threat IP matches as either the source or destination IP of a potential threat conversation. This results in a reduced set requiring processing by asset correlation at correlation engine 107. Correlation engine 107 performs correlation to find the Intersection{refined threat flows, discovered IPs} generating S{critical network flows}. The resulting {critical network flows} are then used by other systems, processes or people to identify and remediate compromised devices.

Thus, the systems and methods of the present invention execute real-time analysis between (1) network state metadata, (2) parsed threat intelligence, and (3) net flow metadata.

Figure 2:
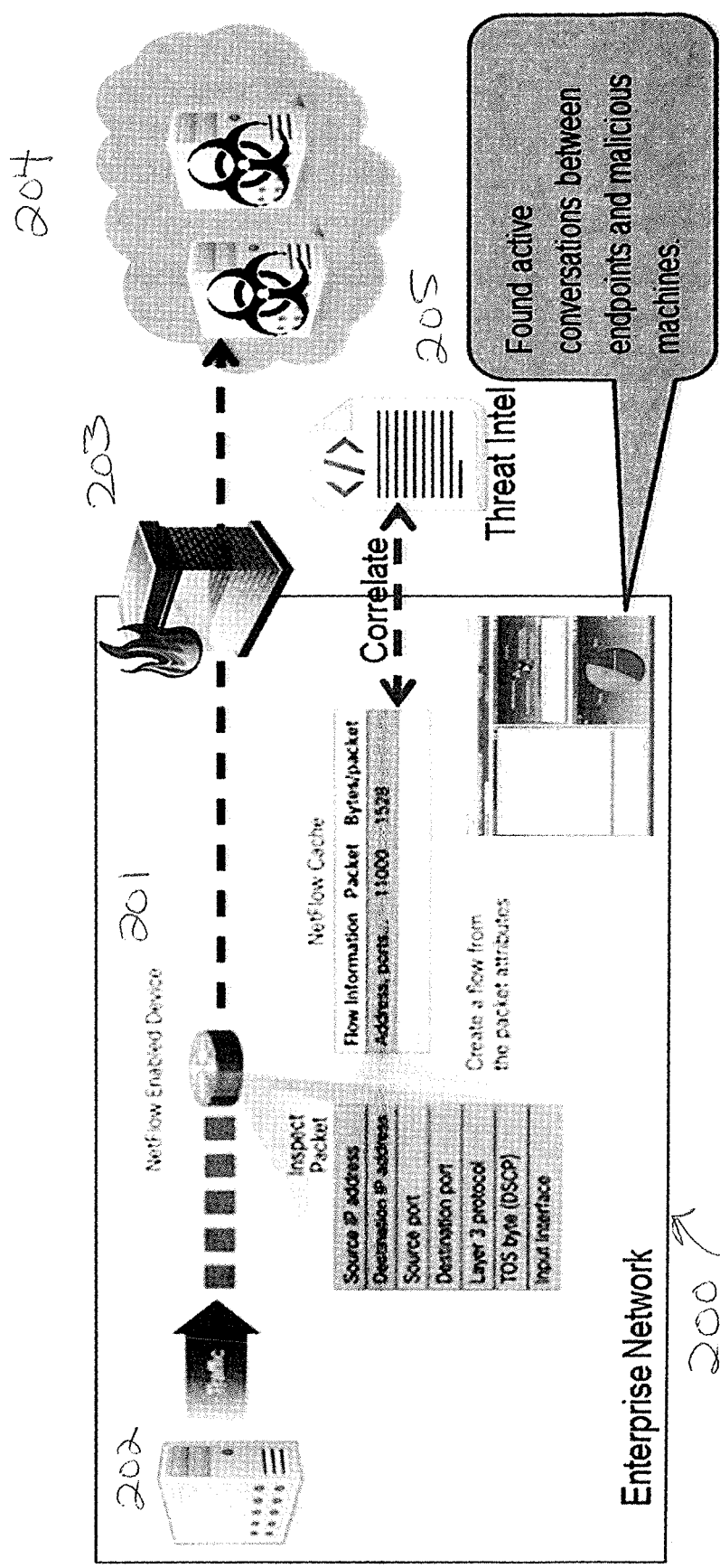
FIG. 2 is a further flow diagram illustrating an exemplary method of the present invention, and associated hardware/software components.

FIG. 2 further illustrates the methods and systems of the present invention. Within an enterprise network 200, packet information for a communication between a server 202 and a netflow enabled device 201 (e.g., a firewall, edge router/switch) is analyzed. In this example, data describing the source IP address, destination IP address, source port, destination port, layer 3 protocol DSCP and input interface is analyzed. Beyond the firewall 203 is malicious actor server (s) 204, which is known through publicly available sources 205. A flow is created from the packet attributes (i.e., a flow-enabled device sees the data packets with payload passing through it that comprise the uni-directional communication between a source and destination IP address and creates a record which has those indicated attributes extracted from the packet headers). By correlating the netflow cache data with the data regarding malicious actor server(s) 204, active conversations between device 201 and server 204 are found and, thus, can be remediated.

A further example is now described. Unbeknownst to the security team, IP address 1.2.3.4 is a compromised device, actively engaging with a malicious actor with IP address 5.6.7.8. Real-time, holistic indexing of network infrastructure connection topology and endpoints/hosts/IoT devices is being performed. During the course of indexing, endpoint with IP address 1.2.3.4 is found and cataloged. Concurrently, open source and/or subscription-based threat intelligence service feeds and repositories are being processed. The threat intelligence feed, which enumerate malicious actor IP addresses, contains IP address 5.6.7.8. Also concurrently, netflow summary details containing transactions between the device with IP address 1.2.3.4 and malicious actor with IP address 5.6.7.8 are ingested. The processed threat intelligence feed is correlated with the ingested netflow. IP address 5.6.7.8 is identified as having unauthorized communications with IP address 1.2.3.4. An analysis of the foregoing indicates that the source machine (or destination machine, depending on flow direction) has been compromised. Such findings may result in a security team performing manual incident response immediately or pursuing automated endpoint remediation actions, such as endpoint sequestration via device client software or network infrastructure (e.g. NAC) quarantining, virtual firewall orchestration, or DNS redirection, by way of example.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A computer-implemented method comprising:
    receiving an index of network data, comprising network infrastructure data, network connection topology data and network devices data including the IP addresses of network devices, collected in real time;
    receiving data describing one or more cybersecurity threat sources;
    receiving data describing communications occurring with devices within the network;
    analyzing the data describing the one or more cybersecurity threat sources and the data describing the communications occurring with devices within the network to identify data describing one or more possible security threats, wherein the data describing one or more possible security threats includes netflow cache data identifying a source IP address and a destination IP address for network communications associated with possible security threats; and
    while receiving the data describing communications occurring with devices within the network, collected in real time, correlating the data describing the one or more possible security threats including the netflow cache data identifying the source IP address and the destination IP address for network communications associated with possible security threats with the index of network data including the IP addresses of network devices by matching the IP addresses in the netflow cache data to the IP addresses in the index of network data to identify one or more security threats to devices within the network.

2. The computer-implemented method of claim 1, wherein the indexing of network data is collected based on control plane data.

3. A system comprising:
    memory operable to store at least one program;
    at least one processor communicatively coupled to the memory, in which the at least one program, when executed by the at least one processor, causes the at least one processor to perform a method comprising:
        receiving an index of network data, comprising network infrastructure data, network connection topology data and network devices data including IP addresses of network devices, collected in real time;
        receiving data describing one or more cybersecurity threat sources;
        receiving data describing communications occurring with devices within the network;
        analyzing the data describing the one or more cybersecurity threat sources and the data describing the communications occurring with devices within the network to identify data describing one or more possible security threats, wherein the data describing one or more possible security threats includes netflow cache data identifying a source IP address and a destination IP address for network communications associated with possible security threats; and
        while receiving the data describing communications occurring with devices within the network, collected in real time, correlating the data describing the one or more possible security threats including the netflow cache data identifying the source IP address and the destination IP address for network communications associated with possible security threats with the index of network data including the IP addresses of network devices by matching the IP addresses in the netflow cache data to the IP addresses in the index of network data to identify one or more security threats to devices within the network.

4. A non-transitory computer readable storage medium having stored thereon computer-executable instructions which, when executed by a processor, perform a method comprising:
    receiving an index of network data, comprising network infrastructure data, network connection topology data and network devices data including IP addresses of network devices, collected in real time;
    receiving data describing one or more cybersecurity threat sources;
    receiving data describing communications occurring with devices within the network, collected in real time;
    analyzing the data describing the one or more cybersecurity threat sources and the data describing the communications occurring with devices within the network to identify data describing one or more possible security threats, wherein the data describing one or more possible security threats includes netflow cache data identifying a source IP address and a destination IP address for each network communication; and
    while receiving the data describing communications occurring with devices within the network, collected in real time, correlating the data describing the one or more possible security threats including the netflow cache data identifying the source IP address and the destination IP address for network communications associated with possible security threats with the index of network data including the IP addresses of network devices by matching the IP addresses in the netflow cache data to the IP addresses in the index of network data to identify one or more security threats to devices within the network.

* * * * *